No. 639,100. Patented Dec. 12, 1899.
F. W. SCHROEDER & W. J. H. CARR-BOYD.
PNEUMATIC TIRE FOR BICYCLES.
(Application filed May 22, 1899.)
(No Model.)
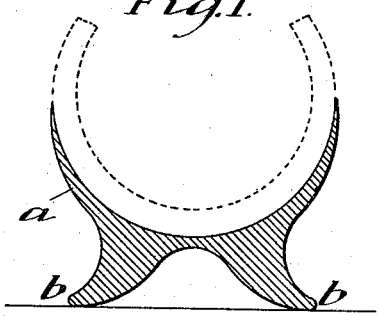
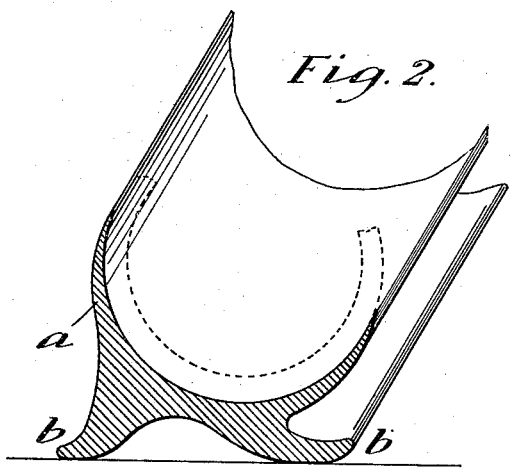
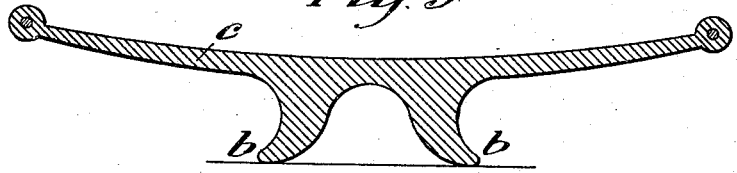

United States Patent Office.

FREDERICK WILLIAM SCHROEDER AND WILLIAM JAMES HENRY CARR-BOYD, OF LONDON, ENGLAND, ASSIGNORS OF ONE-HALF TO CRANDON DAWES GILL, OF SAME PLACE.

PNEUMATIC TIRE FOR BICYCLES.

SPECIFICATION forming part of Letters Patent No. 639,100, dated December 12, 1899.

Application filed May 22, 1899. Serial No. 717,837. (No model.)

*To all whom it may concern:*

Be it known that we, FREDERICK WILLIAM SCHROEDER, residing at 19 Adam street, Adelphi, and WILLIAM JAMES HENRY CARR-BOYD, residing at the Savage Club, Adelphi Terrace, London, England, citizens of England, have invented a certain new and useful Improvement in or Applicable to Pneumatic Tires for Bicycles and other Velocipedes, (for which application has been made for a patent in Great Britain, dated November 8, 1898, No. 23,471,) of which the following is a specification.

Our invention relates to that description of pneumatic tires in which the tire or cover is formed with two more or less projecting ribs on their periphery for the purpose either of keeping the inflated body of the tire out of contact with the ground, and thus prevent puncture, or of giving the tire a square tread, so as to afford greater grip on the ground. For this purpose the said ribs have heretofore either been made rectangular in cross-section or of a V-shaped section. In either case the disadvantage arises that when the bicycle is canted over at an angle in running on curves the tire only rests on the one rib, which in consequence of its shape only bears with a comparatively sharp edge on the ground, and consequently offering only very little hold thereon, so that there is great liability to side slip.

Our present invention relates to an improved construction of such ribs, whereby on the canting over of the wheel an increased instead of a decreased grip on the ground is afforded, and thus the danger of side slip greatly minimized.

It consists in making such ribs of an outward-curved tapering form, as shown on the accompanying drawings, wherein—

Figure 1 is a cross-sectional view of a tire, having a band applied thereto provided with ribs according to this invention. Fig. 2 is a similar view showing the position of the ribs when the tire and wheel are tilted at an angle, as in rounding curves and the like. Fig. 3 shows a form of the invention in which the ribs are formed integral with the tire.

Referring to the drawings, Figs. 1 and 2, the letter $a$ designates a band adapted to be cemented or otherwise attached to the tire or tire-cover, (shown in dotted lines,) said band being provided on the tread-surface with two separated deep ribs $b\ b$ of tapering and outwardly-curved form. It will be seen that by the outward-curved form of the ribs $b\ b$ they will be caused to spread outward under the weight of a load, and this outward spread will be still further increased on the one side when the wheel is tilted at an angle, as shown in Fig. 2, thus affording a greatly-increased gripping-surface on that side and effectually preventing side slip.

In Fig. 3 of the drawings we have shown the ribs $b'\ b'$ formed integral with a tire-cover $c$, instead of forming them on a band $a$ to be applied to the tire or tire-cover, as illustrated in Figs. 1 and 2.

What we claim, and desire to secure by Letters Patent, is—

1. A pneumatic tire provided on the tread-surface with two deep ribs, tapering in form and curved outward in opposite directions, said ribs being adapted to spread apart when the wheel is tilted over to one side and thus prevent side slip, substantially as described.

2. A pneumatic tire provided on its tread-surface with two outwardly-projecting deep ribs formed integral therewith, the outer and inner walls of said ribs being directed outward and gradually converged toward each other so that the outer ends of the ribs will be of reduced thickness, substantially as described.

In testimony whereof we have hereunto set our hands in presence of two subscribing witnesses.

FREDERICK WILLIAM SCHROEDER.
WILLIAM JAMES HENRY CARR-BOYD.

Witnesses:
CHARLES D. ABEL,
JNO. P. M. MILLARD.